United States Patent
Alford et al.

(10) Patent No.: US 8,678,229 B1
(45) Date of Patent: *Mar. 25, 2014

(54) PROTECTIVE SLEEVE SYSTEM FOR VIALS

(71) Applicants: Sharla M. Alford, Fort Worth, TX (US); Brandon Cates, Fort Worth, TX (US)

(72) Inventors: Sharla M. Alford, Fort Worth, TX (US); Brandon Cates, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/630,216

(22) Filed: Sep. 28, 2012

Related U.S. Application Data

(63) Continuation-in-part of application No. 13/189,310, filed on Jul. 22, 2011, now Pat. No. 8,297,469, which is a continuation-in-part of application No. 12/393,882, filed on Feb. 26, 2009, now abandoned.

(51) Int. Cl.
  *B65D 25/00* (2006.01)
(52) U.S. Cl.
  USPC .................. 220/737; 220/739; 220/592.2
(58) Field of Classification Search
  USPC ............ 220/592.2, 737, 739, 23.87; 206/446; 215/390; D3/229
  See application file for complete search history.

(56) References Cited

U.S. PATENT DOCUMENTS

| | | | |
|---|---|---|---|
| 3,106,313 A | 10/1963 | Kurhan | |
| 3,309,893 A | 3/1967 | Heffler et al. | |
| 4,353,869 A | 10/1982 | Guth | |
| 4,368,819 A | 1/1983 | Durham | |
| 4,738,364 A | 4/1988 | Yeager | |
| 4,746,017 A | 5/1988 | Howard et al. | |
| D299,954 S | 2/1989 | Baxter | |
| 4,882,914 A | 11/1989 | Haines-Keeley et al. | |
| D304,972 S | 12/1989 | Baxter | |
| D304,973 S | 12/1989 | Baxter | |
| 4,955,480 A | 9/1990 | Sexton | |
| D320,931 S | 10/1991 | Siegel | |
| D328,429 S | 8/1992 | Ben-Uri | |
| 5,160,021 A | 11/1992 | Sibley et al. | |
| D335,613 S | 5/1993 | Bingham | |
| D355,970 S | 2/1995 | Monthony et al. | |
| 5,564,561 A | 10/1996 | Black et al. | |
| 5,564,583 A | 10/1996 | Kelley et al. | |
| D378,940 S | 4/1997 | Baxter | |
| 5,727,709 A | 3/1998 | Nobile | |
| D417,273 S | 11/1999 | Walker | |
| D446,865 S | 8/2001 | Conway | |
| 6,401,993 B1 | 6/2002 | Andrino | |
| D549,099 S | 8/2007 | Edwards | |
| D565,412 S | 4/2008 | Fuller | |
| D620,604 S | 7/2010 | Alford | |
| D625,513 S * | 10/2010 | Carnes et al. | D3/229 |
| 8,297,469 B1 * | 10/2012 | Alford et al. | 220/737 |
| 2004/0182870 A1 | 9/2004 | Rodgers | |
| 2008/0179339 A1 * | 7/2008 | Lafaver | 220/694 |

FOREIGN PATENT DOCUMENTS

GB 2240332 A 7/1991

* cited by examiner

*Primary Examiner* — Anthony Stashick
*Assistant Examiner* — Robert Stodola

(57) ABSTRACT

A protective sleeve system featuring a housing having an inner cavity adapted to hold a vial. The top of the housing is at an angle with respect to the side wall forming a crater. An aperture is disposed at the narrowest part of the crater providing access to the inner cavity of the housing. Two windows are disposed in the side wall of the housing and positioned opposite each other. A drainage hole is disposed in the bottom surface of the housing and is fluidly connected to the inner cavity of the housing.

4 Claims, 5 Drawing Sheets

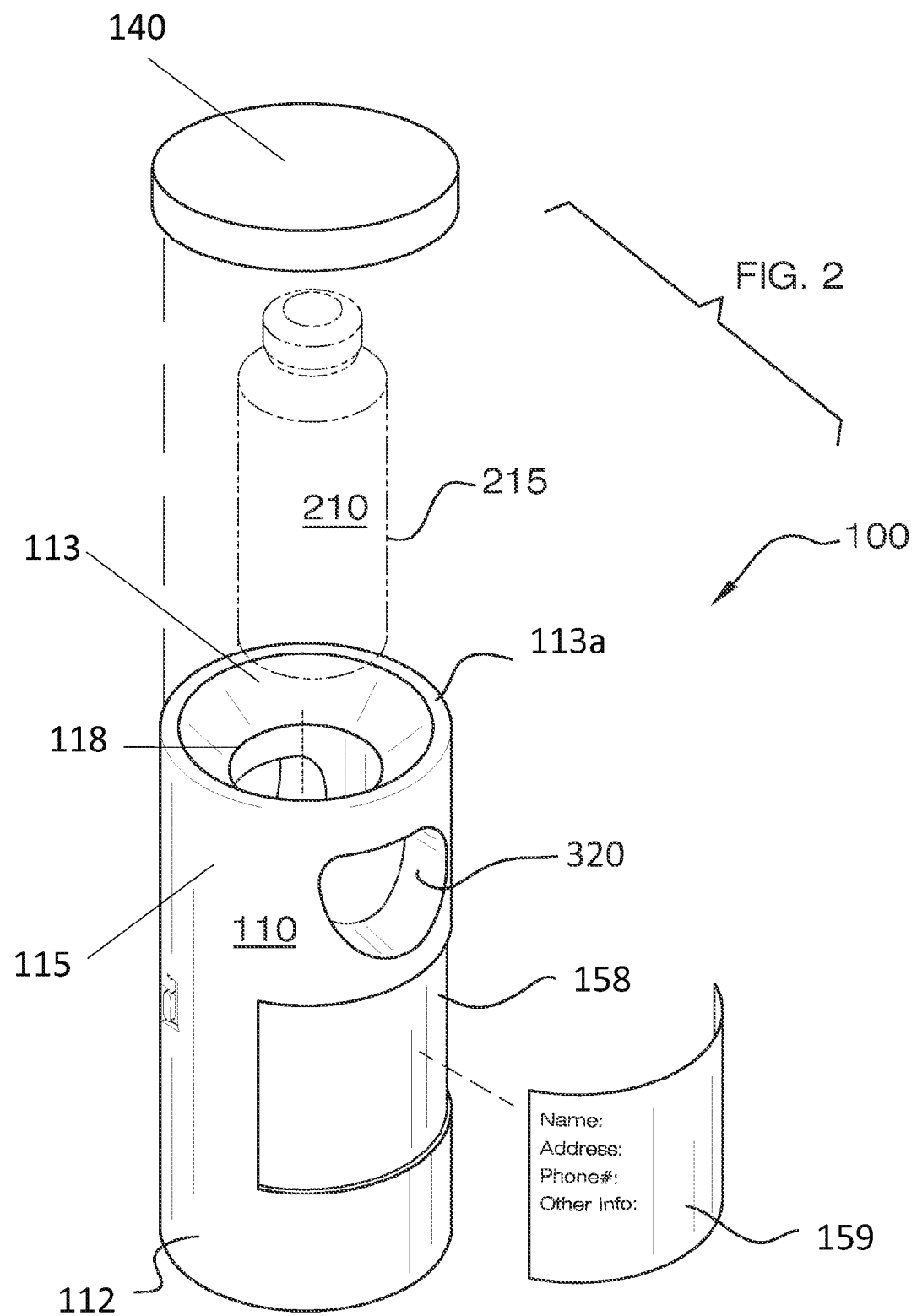

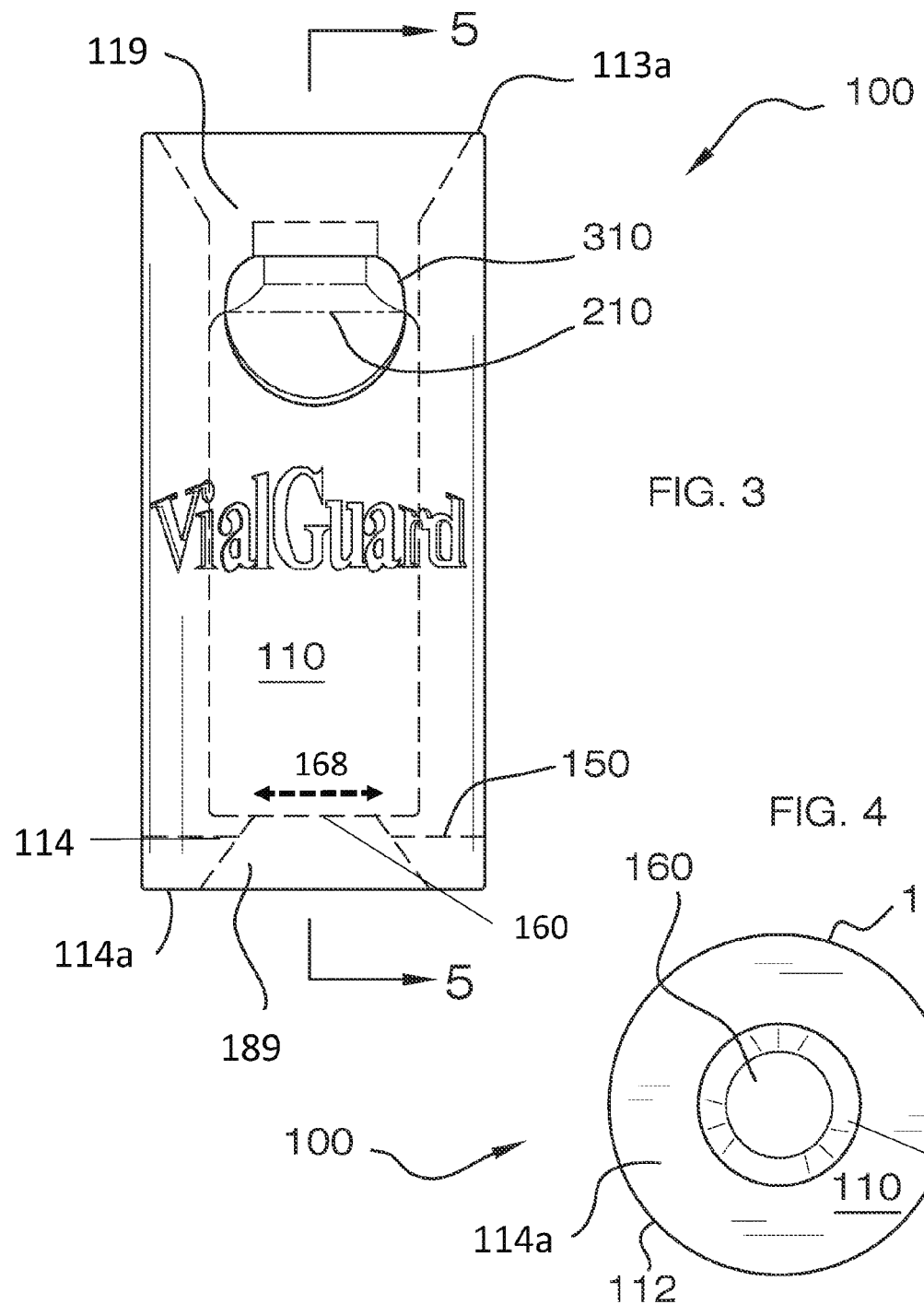

PROTECTIVE SLEEVE SYSTEM FOR VIALS

CROSS REFERENCE

This application is a continuation-in-part of U.S. patent application Ser. No. 13/189,310 filed Jul. 22, 2011, which is a continuation-in-part of U.S. patent application Ser. No. 12/393,882 filed Feb. 26, 2009, the disclosures of which are incorporated herein by reference in their entirety.

FIELD OF THE INVENTION

The present invention is directed to a protective device for protecting a vial such as a vial of insulin.

BACKGROUND OF THE INVENTION

Vials containing medications, for example insulin, are fragile and require careful handling. The present invention features a protective sleeve system for protecting a vial. The system of the present invention may help a user transport his/her vials more easily and safely. The system of the present invention may also help keep the contents of the vial cool.

SUMMARY

The present invention features a protective sleeve system. In some embodiments, the protective sleeve system comprises a housing having side wall, a top, a top edge, a bottom surface, and an inner cavity, the inner cavity is adapted to temporarily hold a vial, the top of the housing is at an angle with respect to the side wall of the housing such that a top crater is formed; an aperture providing access to the inner cavity of the housing such that a vial can be inserted into the inner cavity of the housing, the aperture is disposed in the top of the housing at a narrowest part of the top crater; a first window and a second window each disposed in the side wall of the housing, the windows provide access to the inner cavity of the housing, the first window is positioned opposite the second window; and a drainage hole disposed in the bottom surface of the housing and fluidly connected to the inner cavity of the housing, the drainage hole allows a liquid to drain from the inner cavity of the housing.

In some embodiments, the housing is cylindrical-shaped, cuboidal-shaped, or geometric prism-shaped. In some embodiments, the inner cavity is cylindrical in shape. In some embodiments, the windows are positioned near the top edge of the housing. In some embodiments, the angle is between about 10 to 80 degrees. In some embodiments, the bottom surface of the housing is at an angle with respect to the side wall of the housing forming a bottom crater, wherein the drainage hole is positioned at a narrowest part of the bottom crater.

In some embodiments, the system further comprises a cooling element disposed in the side wall of the housing. In some embodiments, the cooling element is constructed from a material comprising a cellulose, hydroxyethyl cellulose, sodium chloride, water, ammonium chloride, urea, or a combination thereof. In some embodiments, the system further comprises a label indentation disposed in the side wall of the housing, the label indentation is adapted to receive a label.

In some embodiments, the system further comprises a weight disposed in the housing at or near the bottom surface of the housing. In some embodiments, the weight surrounds the bottom crater. In some embodiments, the weight surrounds the drainage hole. In some embodiments, the system further comprises a strap having a first end and a second end, the first end is attached to the side wall of the housing in a first position and the second end is attached to the side wall of the housing in a second position. In some embodiments, the first end is removably attached to the side wall of the housing. In some embodiments, the first position is opposite the second position. In some embodiments, a strap aperture is disposed in the strap.

In some embodiments, the system further comprises a lid removably attached to the housing, wherein the lid can move between at least an open position and a closed position respectively allowing and preventing access to the inner cavity.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 is an exploded view of the system of the present invention.

FIG. 3 is a side in-use view of the system of the present invention.

FIG. 4 is a bottom view of the system of the present invention.

DESCRIPTION OF PREFERRED EMBODIMENTS

Figure 1:
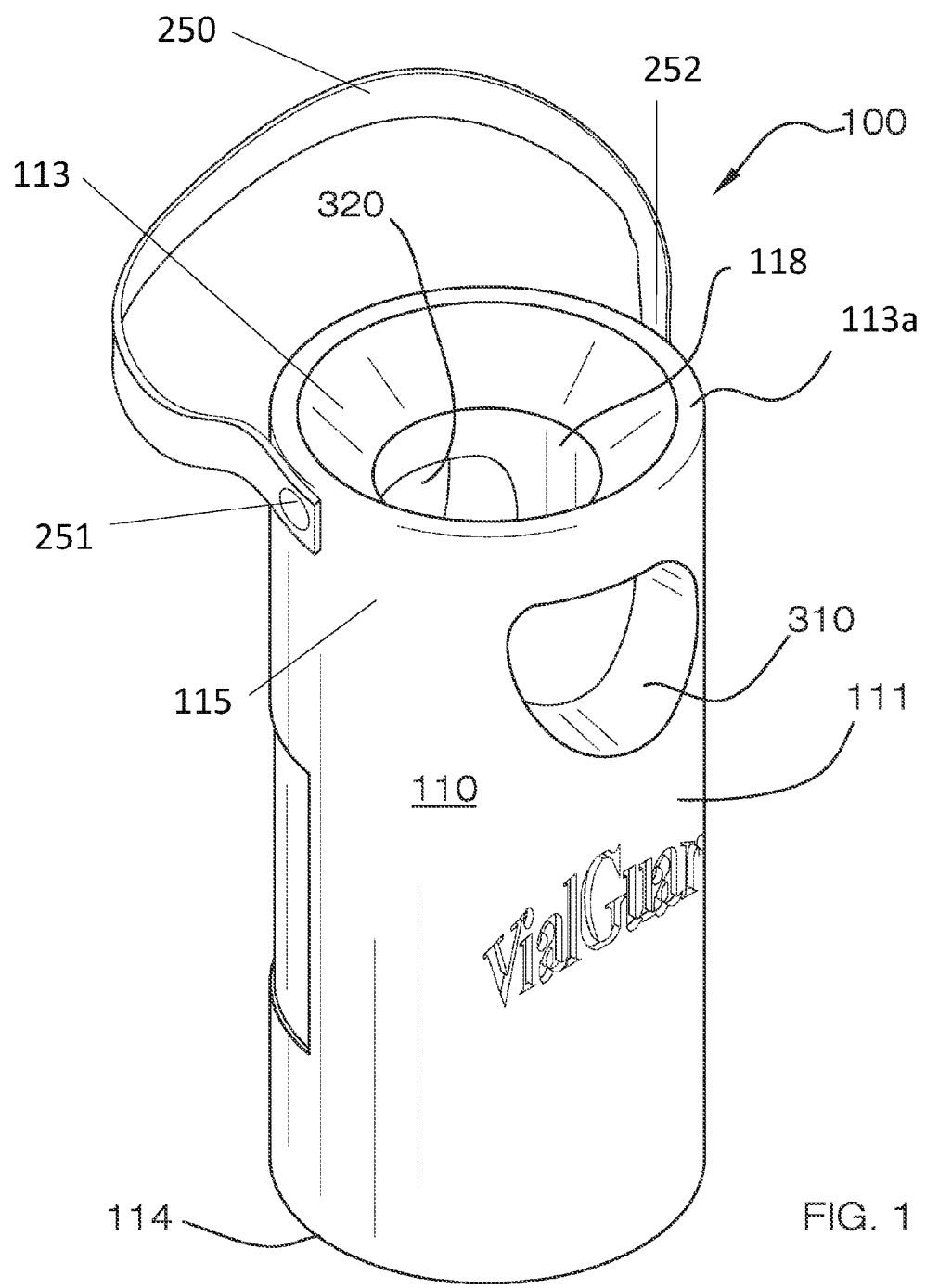
FIG. 1 is a perspective view of the system of the present invention.

Referring now to FIG. 1-6, the present invention features a protective sleeve system 100 for a vial 210 (e.g., an insulin vial). The system 100 comprises a housing 110 having side wall 115 (e.g., with a front surface 111 and a back surface 112), a top 113, a bottom surface 114, and an inner cavity 120. The inner cavity 120 is adapted to temporarily hold a vial 210 (e.g., snugly hold the vial 210). The housing 110 may be constructed in a variety of shapes, e.g., cylindrical-shaped, cuboidal-shaped, geometric prism-shaped such as triangular prism-shaped, hexagonal prism-shaped, etc. The housing 110 is not limited to the aforementioned shapes. In some embodiments, the inner cavity 120 is generally cylindrical so as to hold a vial 210.

Figure 5:
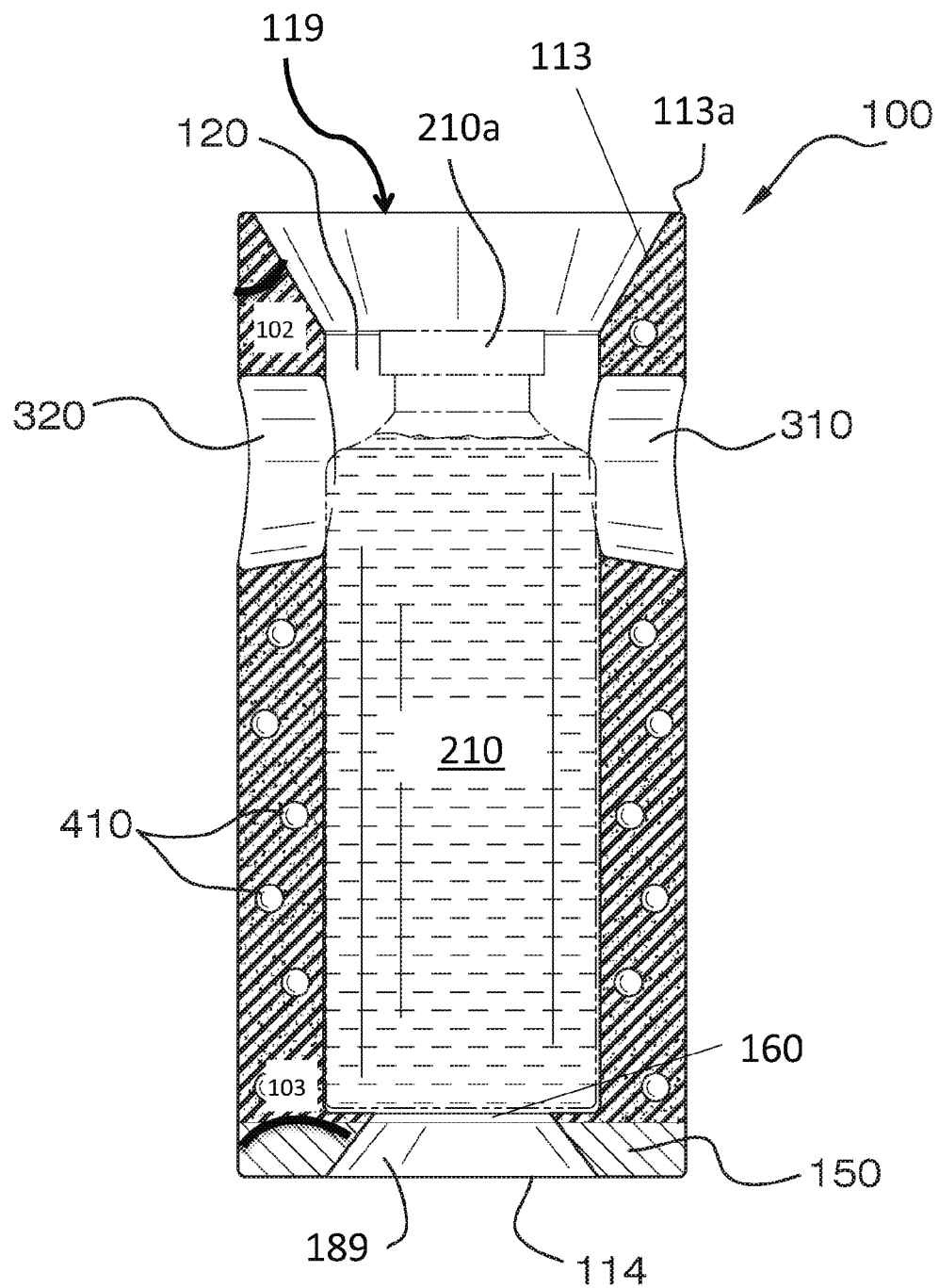
FIG. 5 is a side cross-sectional view of the system of the present invention.

An aperture 118 is disposed in the top 113 of the housing 110. The aperture 118 provides access to the inner cavity 120 of the housing 110. For example, a vial 210 can be inserted into the inner cavity 120 via the aperture 118. The top 113 of the housing 110 is beveled, for example the top 113 of the housing 110 is at an angle 102 with respect to the side wall 115 of the housing 110 (angle 102 is shown in FIG. 5). A top edge 113a is formed between the side wall 115 of the housing 110 and the top 113 of the housing 110. The position of the aperture 118 is lower (e.g., closer to the bottom surface 114 of the housing 110) than the position of the top edge 113a of the housing 110. This configuration forms a top crater 119 at the top of the housing 110 (e.g., see FIG. 5). As shown in FIG. 2, the aperture 118 is positioned at the narrower part of the top crater 119. As shown in FIG. 5, in some embodiments, the top crater 119 has a trapezoidal shape as viewed from the side. As shown in FIG. 5, the top crater 119 formed from the top 113 of the housing 110 and the top edge 113 of the housing 110 provides a user ample room to access the top 210a of the vial 210.

In some embodiments, the angle 102 is between about 5 to 10 degrees. In some embodiments, the angle 102 is between about 10 to 20 degrees. In some embodiments, the angle 102 is between about 20 to 30 degrees. In some embodiments, the angle 102 is between about 30 to 40 degrees. In some embodiments, the angle 102 is between about 40 to 50 degrees. In some embodiments, the angle 102 is between about 50 to 60 degrees. In some embodiments, the angle 102 is between about 60 to 70 degrees. In some embodiments, the angle 102 is between about 70 to 80 degrees. In some embodiments, the angle 102 is between about 5 to 20 degrees. In some embodiments, the angle 102 is between about 5 to 30 degrees. In some embodiments, the angle 102 is between about 10 to 30 degrees. In some embodiments, the angle 102 is between about 10 to 40 degrees. In some embodiments, the angle 102 is between about 10 to 50 degrees. In some embodiments, the angle 102 is between about 20 to 40 degrees. In some embodiments, the angle 102 is between about 20 to 50 degrees. In some embodiments, the angle 102 is between about 20 to 60 degrees. In some embodiments, the angle 102 is between about 20 to 70 degrees. In some embodiments, the angle 102 is between about 10 to 60 degrees. In some embodiments, the angle 102 is between about 10 to 70 degrees. In some embodiments, the angle 102 is between about 10 to 80 degrees. In some embodiments, the angle 102 is between about 20 to 80 degrees. In some embodiments, the angle 102 is between about 30 to 60 degrees. In some embodiments, the angle 102 is between about 30 to 70 degrees. In some embodiments, the angle 102 is between about 30 to 80 degrees. In some embodiments, the angle 102 is between about 40 to 60 degrees. In some embodiments, the angle 102 is between about 40 to 70 degrees. In some embodiments, the angle 102 is between about 40 to 80 degrees. In some embodiments, the angle 102 is between about 50 to 70 degrees. In some embodiments, the angle 102 is between about 50 to 80 degrees. In some embodiments, the angle 102 is between about 60 to 80 degrees.

In some embodiments, a first window 310 is disposed in the side wall 115 of the housing 110, e.g., in the front surface 111. In some embodiments, a second window 320 is disposed in the side wall 115 of the housing 110, e.g., in the back surface 112. In some embodiments, the front surface 111 is opposite the back surface 112. In some embodiments, the first window 310 and/or second window 320 may help a user remove a vial 210 from the inner cavity 120 of the housing 110. For example, the windows 310, 320 may allow a user to grasp the vial 210 while it is in the inner cavity 120 (e.g., an ultimately pull upwardly on the vial 210). In some embodiments, the windows 310, 320 help a user view the contents of the vial 210.

In some embodiments, the windows 310, 320 can help a user view a needle being inserted into the vial 210 (e.g., into the top 210a of the vial 210). For example, in some embodiments, the windows 310, 320 are positioned near the top edge 113a of the housing 110, e.g., just below the top crater 119, e.g., just below the aperture 118. FIG. 5 shows the position of the windows 310, 320 wherein the windows 310, 320 allow a user to see the top 210a of the vial 210. The height of the housing 110 is measured from the top edge 113a to the bottom edge 114a. The windows 310, 320 may be positioned in the top half of the height of the housing 110, the top half being the half including the top edge 113a of the housing 110.

The windows 310, 320 may be constructed in any shape (e.g., circular, rectangular, triangular, irregular in shape, etc.). The windows 310, 320 may be constructed in any size.

As shown in FIG. 5, the inner cavity 120 is adapted to hold (e.g., snugly hold) a vial 210. For example, in some embodiments, the outer surface 215 of the vial 210 rests against the inner walls of the inner cavity 120. The vial 210 can be inserted into the inner cavity 120 via the aperture 118 at the bottom of the crater 119 formed from the angled top 113 of the housing 110.

Condensation may collect in the inner cavity 120 of the housing 110. As shown in FIG. 3, FIG. 4, and FIG. 5, in some embodiments, a drainage hole 160 is disposed in the bottom surface 114 of the housing 110. The drainage hole 160 allows for condensation to drain from the inner cavity 120. The drainage hole 160 may also be used to help a user remove the vial 210 from the inner cavity 120. For example, a user can push his/her finger through the drainage hole 160 so as to push the vial 210 out of the aperture 118 in the top 113 of the housing 110. In some embodiments, a bottom crater 189 is formed in the bottom surface 114 of the housing 110 (similar to the top crater 119), wherein the bottom surface 114 of the housing 110 is at an angle 103 with respect to the side wall 115 of the housing 110. The drainage hole 160 is positioned at the narrower part of the bottom crater 189 (e.g., see FIG. 3, FIG. 5). FIG. 5 shows the angle 103. Angle 103 refers to the angle between the bottom crater (189) and the side wall 115.

In some embodiments, a label indentation 158 is disposed in the side wall 115 (e.g., the front surface 111, the back surface 112, etc.) of the housing 110. The label indentation 158 is adapted to receive a label 159 (see FIG. 2). The label 159 may provide information about the user and/or about the contents of the vial 210, for example.

In some embodiments, a weight 150 is disposed in housing 110 at or near the bottom surface 114 of the housing 110. The weight 150 may help to keep the housing 110 standing in an upright position (e.g., the bottom surface 114 downward and the top surface 113 upward). As shown in FIG. 5, the weight 150 may surround the bottom crater 189. In some embodiments, the weight 150 surrounds the drainage hole 160.

In some embodiments, a cooling element 410 is disposed in the housing 110 (e.g., in the side wall 115 of the housing 110). The cooling element 410 is designed to help chill the contents of the inner cavity 120, for example the vial 210. In some embodiments, a user can place the system 100 in a freezer or a refrigerator so as to chill the cooling element 410. When the user is ready to use the protective sleeve device 100, he/she can place a vial 210 in the inner cavity 120. The chilled cooling element 410 may help to keep the vial 210 cold. Such cooling elements are well known to one of ordinary skill in the art. For example, the cooling element 410 may comprise a gel. In some embodiments, the cooling element 410 comprises cellulose, hydroxyethyl cellulose, sodium chloride, water, ammonium chloride, urea, the like, or a combination thereof. The cooling element 410 is not limited to the aforementioned materials.

Figure 6:
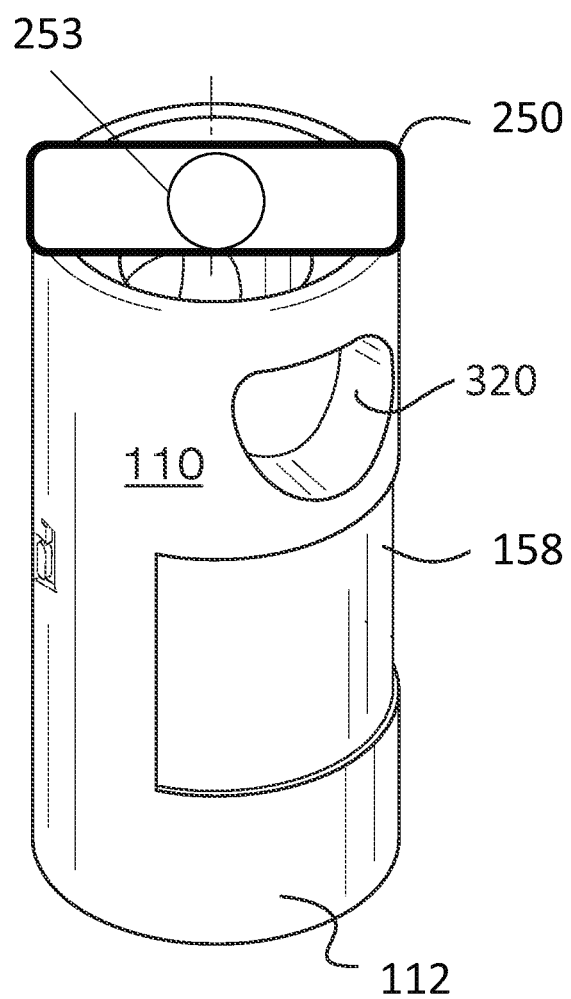
FIG. 6 is a perspective view of the system of the present invention, wherein a strap covers the top of the housing.

In some embodiments, the system 100 further comprises a strap 250 attached to the housing 110. The strap 250 has a first end 251 and a second end 252. The first end. 151 is attached to the side wall 115 of the housing 110 in a first position, and the second end 252 is attached to the side wall 115 of the housing 110 in a second position. In some embodiments, the first position is opposite the second position. In some embodiments, the first position and/or the second position are near the top edge 113 of the housing 110. In some embodiments, the strap 250 is for helping to secure a vial 210 inside the inner cavity 120. In some embodiments, the strap 250 is for helping to carry the housing 110. In some embodiments, the strap 250 is removable. As shown in FIG. 6, in some embodiments, a strap aperture 253 (e.g., a hole in the strap 250) is disposed in the strap 250. The strap aperture 253 may help to provide a user access to the contents of the vial 210 white the strap 250 secures the vial 210 in the housing 110.

As shown in FIG. 2, in some embodiments, the system 100 further comprises a lid 140. The lid 140 may be removably attached to the housing 110 (e.g., at the top edge 113). In some embodiments, the lid 140 is pivotally attached to the housing 110 (e.g., the lid 140 is attached on one end to the housing 110). The lid 140 can move between at least an open position and a closed position respectively allowing and preventing access to the top crater 119 and/or inner cavity 120 and/or vial 210 In some embodiments, the lid 140 can be secured in the closed position via a securing means (e.g., a snap mechanism, a buckle mechanism, a magnet mechanism, a hook-and-loop fastener mechanism, a clip mechanism, a hook mechanism, the like, a combination thereof).

The system 100 of the present invention may be constructed from a variety of materials. For example, in some embodiments, the housing 110 is constructed from a soft and protective material (e.g., foam). In some embodiments, the housing 110 is constructed with an injection foam molding manufacturing process or any other appropriate manufacturing process. In some embodiments, the housing 110 can float. In some embodiments, the system 100 is reusable.

The system 100 of the present invention may be constructed in a variety of shapes, sizes, styles, designs, and/or colors. For example, in some embodiments, the housing 110 is between about 1 to 2 inches in height as measured from the bottom edge 114a to the top edge 113a. In some embodiments, the housing 110 is between about 2 to 3 inches in height as measured from the bottom edge 114a to the top edge 113a. In some embodiments, the housing 110 is between about 3 to 4 inches in height as measured from the bottom edge 114a to the top edge 113a. The present invention is not limited to the aforementioned dimensions. As used herein, the term "about" refers to plus or minus 10% of the referenced number. For example, an embodiment wherein the housing 110 is about 4 inches in height includes a housing 110 that is between 3.6 and 4.4 inches in height.

In some embodiments, the angle 103 is between about 5 to 10 degrees. In some embodiments, the angle 103 is between about 10 to 20 degrees. In some embodiments, the angle 103 is between about 20 to 30 degrees. In some embodiments, the angle 103 is between about 30 to 40 degrees. In some embodiments, the angle 103 is between about 40 to 50 degrees. In some embodiments, the angle 103 is between about 50 to 60 degrees. In some embodiments, the angle 103 is between about 60 to 70 degrees. In some embodiments, the angle 103 is between about 70 to 80 degrees. In some embodiments, the angle 103 is between about 5 to 80 degrees. In some embodiments, the angle 103 is between about 5 to 20 degrees. In some embodiments, the angle 103 is between about 5 to 30 degrees. In some embodiments, the angle 103 is between about 10 to 30 degrees. In some embodiments, the angle 103 is between about 10 to 40 degrees. In some embodiments, the angle 103 is between about 10 to 50 degrees. In some embodiments, the angle 103 is between about 20 to 40 degrees. In some embodiments, the angle 103 is between about 20 to 50 degrees. In some embodiments, the angle 103 is between about 20 to 60 degrees. In some embodiments, the angle 103 is between about 20 to 70 degrees. In some embodiments, the angle 103 is between about 10 to 60 degrees. In some embodiments, the angle 103 is between about 10 to 70 degrees. In some embodiments, the angle 103 is between about 10 to 80 degrees. In some embodiments, the angle 103 is between about 20 to 80 degrees. In some embodiments, the angle 103 is between about 30 to 60 degrees. In some embodiments, the angle 103 is between about 30 to 70 degrees. In some embodiments, the angle 103 is between about 30 to 80 degrees. In some embodiments, the angle 103 is between about 40 to 60 degrees. In some embodiments, the angle 103 is between about 40 to 70 degrees. In some embodiments, the angle 103 is between about 40 to 80 degrees. In some embodiments, the angle 103 is between about 50 to 70 degrees. In some embodiments, the angle 103 is between about 50 to 80 degrees. In some embodiments, the angle 103 is between about 60 to 80 degrees.

The present invention also features a protective sleeve system (100) comprising a housing (110) having side wall (115), a top (113), a top edge (113a), a bottom surface (114), and an inner cavity (120), the inner cavity (120) is cylindrical in shape and is adapted to temporarily hold a vial (210), the top (113) of the housing (110) is at an angle (102) with respect to the side wall (115) of the housing (110) such that a top crater (119) is formed, wherein at least a portion of the bottom surface (114) of the housing (110) is at an angle (103) with respect to the side wall (115) of the housing (110) such that a bottom crater (189) is formed; an aperture (118) disposed in the top (113) of the housing (110) at a narrowest part of the top crater (119), the aperture (118) provides access to the inner cavity (120) of the housing (110) such that a vial (210) can be inserted into the inner cavity (120) of the housing (110); a first window (310) and a second window (320) each disposed in the side wall (115) of the housing (110), the windows (310, 320) provide access to the inner cavity (120) of the housing (110), the first window (310) is positioned opposite the second window (320); and a drainage hole (160) disposed in the bottom surface (114) of the housing (110) at a narrowest part of the bottom crater (189), the drainage hole (160) is fluidly connected to the inner cavity (120) of the housing (110) allowing a liquid to drain from the inner cavity (120) of the housing (110), the drainage hole (160) having a diameter (168) at the narrowest part of the bottom crater (189) that is at least 1 cm (160) allowing a user to insert his finger into the drainage hole to push a vial out of the inner cavity (120) via the aperture (118), the diameter (168) of the drainage hole (160) at the narrowest part of the bottom crater (189) is less than a diameter of the inner cavity (120).

In some embodiments, the bottom crater (189) forms an angle (130) with respect to the side wall (115) of the housing (110). In some embodiments, the angle (103) is between about 5 to 80 degrees.

In some embodiments, the drainage hole (160) is at least 1.5 cm in diameter.

In some embodiments, the drainage hole (160) is at least 2 cm in diameter.

In some embodiments, the drainage hole (160) is at least 3 cm in diameter.

The disclosures of the following U.S. Patents are incorporated in their entirety by reference herein: U.S. Pat. No. 3,309,893; U.S. Pat. No. 5,564,561; U.S. Pat. No. 3,106,313; U.S. Pat. No. 4,368,819; U.S. Pat. No. 4,955,480; U.S. Pat. No. 4,738,364; U.S. Pat. No. 4,746,017

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A protective sleeve system (100) comprising:
   (a) a housing (110) having side wall (115), a top (113), a top edge (113*a*), a bottom surface (114), and an inner cavity (120), the inner cavity (120) is cylindrical in shape and is adapted to temporarily hold a vial (210), the top (113) of the housing (110) is at an angle (102) with respect to the side wall (115) of the housing (110) such that a top crater (119) is formed, wherein at least a portion of the bottom surface (114) of the housing (110) is at an angle (103) with respect to the side wall (115) of the housing (110) such that a bottom crater (189) is formed;
   (b) an aperture (118) disposed in the top (113) of the housing (110) at a narrowest part of the top crater (119), the aperture (118) provides access to the inner cavity (120) of the housing (110) such that the vial (210) can be inserted into the inner cavity (120) of the housing (110);
   (c) a first window (310) and a second window (320) each disposed in the side wall (115) of the housing (110), the windows (310, 320) provide access to the inner cavity (120) of the housing (110), the first window (310) is positioned opposite the second window (320); and
   (d) a drainage hole (160) disposed in the bottom surface (114) of the housing (110) at a narrowest part of the bottom crater (189), the drainage hole (160) is fluidly connected to the inner cavity (120) of the housing (110) allowing a liquid to drain from the inner cavity (120) of the housing (110), the drainage hole (160) having a diameter (168) at the narrowest part of the bottom crater (189) that is at least 1 cm (160) allowing for a vial to be pushed out of the inner cavity (120) via the aperture (118), the diameter (168) of the drainage hole (160) at the narrowest part of the bottom crater (189) is less than a diameter of the inner cavity (120), the bottom crater (189) forms the angle (103) with respect to the side wall (115) of the housing (110), the angle (103) being between about 5 to 80 degrees.

2. The system (100) of claim 1, wherein the drainage hole (160) is at least 1.5 cm in diameter.

3. The system (100) of claim 1, wherein the drainage hole (160) is at least 2 cm in diameter.

4. The system (100) of claim 1, wherein the drainage hole (160) is at least 3 cm in diameter.

* * * * *